United States Patent
Akihata

(10) Patent No.: US 7,512,312 B2
(45) Date of Patent: Mar. 31, 2009

(54) AUDIOVISUAL INFORMATION DATA PROCESSING APPARATUS

(75) Inventor: Makoto Akihata, Tokyo (JP)

(73) Assignee: Sony Corporation (JP)

( * ) Notice: Subject to any disclaimer, the term of this patent is extended or adjusted under 35 U.S.C. 154(b) by 699 days.

(21) Appl. No.: 11/114,297

(22) Filed: Apr. 26, 2005

(65) Prior Publication Data

US 2005/0244141 A1  Nov. 3, 2005

(30) Foreign Application Priority Data

Apr. 30, 2004  (JP) ............... 2004-135018

(51) Int. Cl.
H04N 7/00 (2006.01)
(52) U.S. Cl. .......................... 386/46; 386/96
(58) Field of Classification Search .............. 386/46, 386/94, 104, 105, 106, 125, 45
See application file for complete search history.

(56) References Cited

U.S. PATENT DOCUMENTS 6,754,548 B1 * 6/2004 Yoshii et al. ................ 700/94
2002/0026867 A1 * 3/2002 Hasegawa et al. ............ 84/609

FOREIGN PATENT DOCUMENTS

| JP | 2000-020689 A | 1/2000 |
| JP | 2002-268951 A | 9/2002 |
| JP | 2003-044365 A | 2/2003 |
| JP | 2003-150456 A | 5/2003 |
| JP | 2003-198718 A | 7/2003 |

* cited by examiner

Primary Examiner—Robert Chevalier
(74) Attorney, Agent, or Firm—Lerner, David, Littenberg, Krumholz & Mentlik, LLP

(57) ABSTRACT

An audiovisual information data processing apparatus includes: data forming unit for forming content list data representing lists concerning audiovisual information data stored in a hard disk drive; image display unit for performing image display for the lists; attribute information detecting unit for detecting, for the audiovisual information data included in the lists, the reproduction limitation information; reproduction limited data recognizing unit for recognizing audiovisual information data, which comes into a state in which reproduction limitation functions, of the audiovisual information data included in the lists as reproduction limited data with reference to the detected reproduction limitation information; and image display control unit for setting a display portion concerning the audiovisual information data, which is recognized as the reproduction limited data in the image display for the lists, as a portion where specific display is performed. The audiovisual information processing apparatus can recognize promptly and easily that the audiovisual information data come into the state in which limitation represented by the reproduction limitation information functions.

10 Claims, 4 Drawing Sheets

AUDIOVISUAL INFORMATION DATA PROCESSING APPARATUS

CROSS-REFERENCES TO RELATED APPLICATIONS

This application contains subject matter related to Japanese Patent Application JP 2004-135018 filed in the Japanese Patent Office on Apr. 30, 2004, the entire contents of which being incorporated herein by reference.

BACKGROUND OF THE INVENTION

1. Field of the Invention

The present invention relates to an audiovisual information data processing apparatus that performs storage, storage state display, and the like for audiovisual information data such as image information data and sound information data that involve reproduction limitation information representing limitation on reproduction of audiovisual information represented by the audiovisual information data.

2. Description of the Related Art

In an information reproduction system and the like using a personal computer, it is a general practice to store audiovisual information data such as image information data and sound information data in a memory section, read out a selected piece of the stored audiovisual information data from the memory section according to circumstances, and reproduce audiovisual information represented by the audiovisual information data as images, sounds, or images and sounds. In such a case, it is not unusual that the audiovisual information data stored in the memory section are audiovisual information data involving reproduction limitation information representing limitation on reproduction of audiovisual information represented by the audiovisual information data, that is, audiovisual information data with reproduction limitation information. The reproduction limitation information involved in the audiovisual information data with reproduction limitation information is reproduction period limiting information that limits a reproduction period by setting a reproduction allowing period, number of times of reproduction limiting information that limits the number of times of reproduction by setting the allowed number of times of reproduction, and the like.

It may be impossible to reproduce audiovisual information represented by the audiovisual information data with reproduction limitation information, which is stored in the memory section in the information reproduction system, even if it is attempted to reproduce the audiovisual information when the reproduction allowing period represented by the reproduction limitation information has not come or has elapsed or when the allowed number of times of reproduction has been reached. In other words, when the reproduction allowing period represented by the reproduction limitation information has not come or has elapsed or when the allowed number of times of reproduction has been reached, although the audiovisual information data are stored in the memory section, it may be impossible to reproduce the audiovisual information represented by the audiovisual information data. When the audiovisual information data with reproduction limitation information in such a state continues to be stored in the memory section for a long period of time, it is likely that a storage capacity of the memory section is only reduced uselessly.

Thus, in the past, there has been proposed a system that adopts an idea of, concerning audiovisual information data with reproduction limitation information stored in a memory section, confirming the reproduction limitation information and, when the audiovisual information data is in a state in which limitation represented by the reproduction limitation information functions, automatically performing an operation for deleting the audiovisual information data from the memory section (see JP-A-2000-20689). In such a system proposed in the past, image data recorded by a digital camera is stored in a hard disk included in the memory section together with data representing an expiration data of the image data. Thereafter, the image data stored in the hard disk is retrieved and it is judged whether the expiration data of the retrieved image data has already elapsed. When the expiration data has not elapsed, the image data stored in the hard disk continues to be stored. When the expiration data has elapsed, the image data is automatically deleted from the hard disk. Consequently, a user of the system is released from, for example, work for confirmation of an unused capacity of the hard disk and a burden of data management work is reduced.

SUMMARY OF THE INVENTION

As in the system described above, when the audiovisual information data with reproduction limitation information, which is stored in the memory section, come into a state in which limitation represented by the reproduction limitation information functions, if the audiovisual information data is automatically deleted from the memory section, the user of the system feels a sense of incongruity about a change in a storage state of the audiovisual information data in the memory section. The audiovisual information data with reproduction limitation information are stored in the memory section on the basis of a positive intension of the user of the system. When the audiovisual information data stored in the memory section come into the state in which limitation represented by the reproduction limitation information functions as described above, the audiovisual information data is deleted from the memory while the user of the system are unaware of the deletion without an intension of the user being confirmed. Thus, the user feels a sense of incongruity.

Therefore, when the audiovisual information data with reproduction limitation information, which is stored in the memory section in the information reproduction system, come into a state in which limitation represented by the reproduction limitation information functions, rather than automatically deleting the audiovisual information data from the memory section, it is desirable that the user of the information reproduction system can easily confirms the fact that the audiovisual information data is in that state and, then, the audiovisual information data is deleted from the memory section according to a positive intension of the user as required. In this way, the user is prevented from feeling a sense of incongruity about a change in a storage state of the audiovisual information data in the memory section.

However, for this purpose, it is necessary to allow the user of the information reproduction system to recognize promptly and easily that the audiovisual information data with reproduction limitation information, which is stored in the memory section in the information reproduction system, come into a state in which limitation represented by the reproduction limitation information functions. This is because, unless the user of the information reproduction system can recognize that fact, the user does not intend to delete the audiovisual information data from the memory section.

Nevertheless, in the past, there is no data processing system that meets such demand.

In view of such a point, in an embodiment of the invention, there is provided an audiovisual information data processing apparatus that, in performing storage, storage state display, and the like for audiovisual information data such as image information data and sound information data that involve reproduction limitation information representing limitation on reproduction of audiovisual information represented by the audiovisual information data, allows a user to recognize promptly and easily that the audiovisual information data with reproduction limitation information, which is stored in a memory section, come into a state in which limitation represented by the reproduction limitation information functions.

The audiovisual information data processing apparatus in the embodiment of the invention includes: memory means for storing audiovisual information data involving reproduction limitation information; data forming means for forming content list data representing lists concerning the audiovisual information data stored in the memory means; image display means for performing image display for the lists concerning audiovisual information data stored in the memory means; attribute information detecting means for detecting, for respective pieces of the audiovisual information data involving reproduction limitation information included in the lists represented by the content list data, the reproduction limitation information; reproduction limited data recognizing means for recognizing audiovisual information data, for which a reproduction allowing period for audiovisual information represented by the audiovisual information data has not come or has elapsed or the allowed number of times of reproduction has been reached, of the audiovisual information data involving reproduction limitation information, which are included in the lists represented by the content list data, as reproduction limited data with reference to the reproduction limitation information detected by the attribute information detecting means; and image display control means for setting a display portion concerning the audiovisual information data, which is recognized as the reproduction limited data by the reproduction limited data recognizing means in the image display for the lists performed by the image display means, as a portion where specific display allowing a user to easily identify presence of the audiovisual information data is performed.

In the audiovisual information data processing apparatus in the embodiment of the invention, the audiovisual information data such as image information data and sound information data involving reproduction limitation information are stored in the memory means. Thereafter, the data forming means forms content list data representing lists concerning the audiovisual information data stored in the memory means. On the basis of the content list data, the image display means performs image display for the lists concerning the audiovisual information data stored in the memory means. At the same time, for the respective pieces of the audiovisual information data involving reproduction limitation information included in the lists represented by the content list data, the attribute information detecting means detects the reproduction limitation information. The reproduction limited data recognizing means recognizes audiovisual information data, for which a reproduction allowing period for audiovisual information represented by the audiovisual information data has not come or has elapsed or the allowed number of times of reproduction has been reached, of the audiovisual information data involving reproduction limitation information, which are included in the lists represented by the content list data, as reproduction limited data with reference to the reproduction limitation information detected by the attribute information detecting means.

Then, the image display control means sets a display portion concerning the audiovisual information data, which is recognized as the reproduction limited data by the reproduction limited data recognizing means in the image display for the lists performed by the image display means, as a portion where specific display allowing a user to easily identify presence of the audiovisual information data is performed. In such a case, for example, as in the case of the audiovisual information data processing apparatus in the embodiment of the invention, the portion, where the specific display is performed, is set as a portion where display is highlighted compared with a display portion around the portion, a portion where display reverse to the display portion around the portion is performed, or a portion where display with a color different from the display portion around the portion is performed.

DESCRIPTION OF THE PREFERRED EMBODIMENTS

Embodiments of the present invention will be hereinafter explained in detail with reference to the accompanying drawings.

Figure 1:
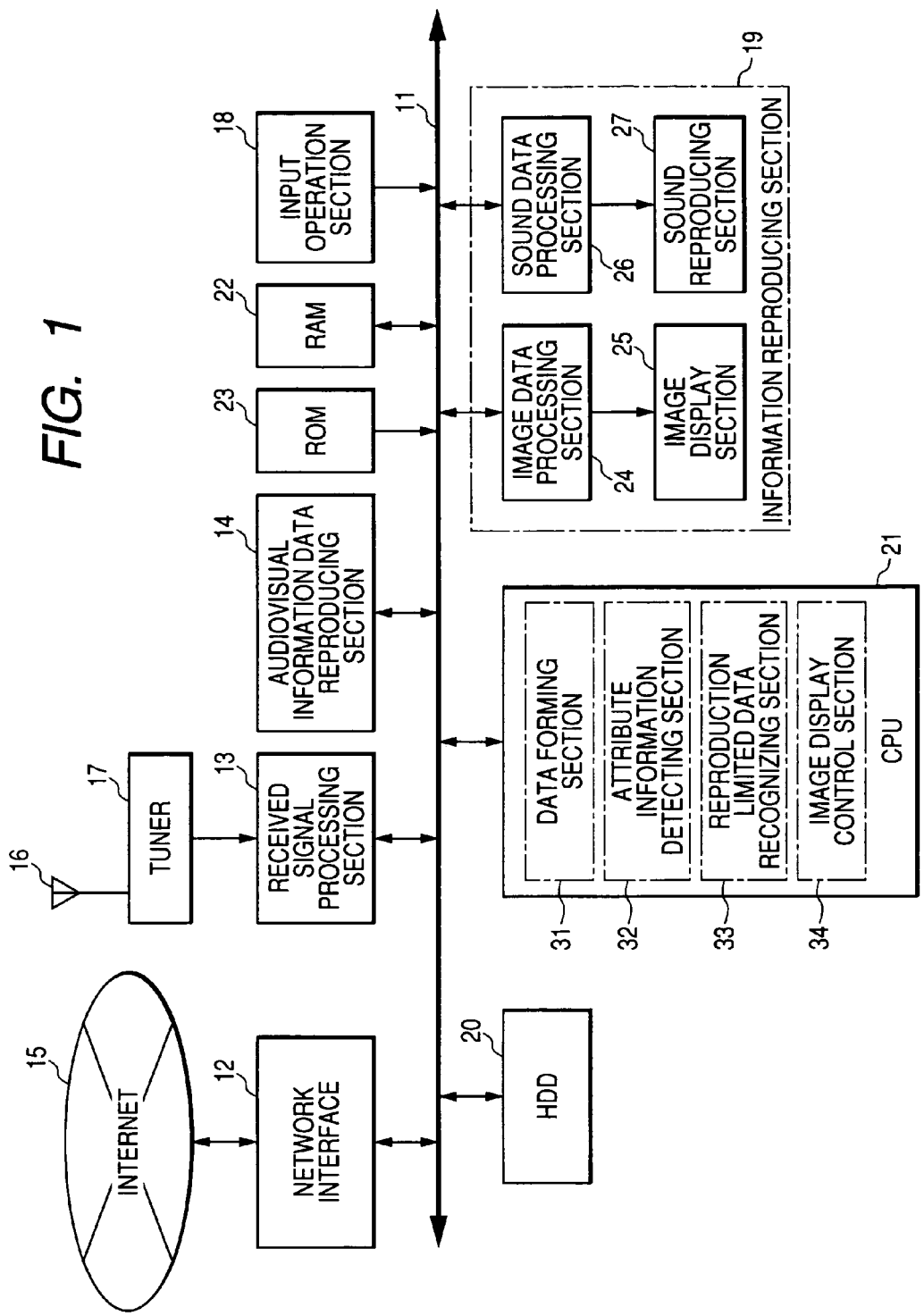
FIG. 1 is a diagram showing an example of an audiovisual information data processing apparatus in an embodiment of the invention in a state in which the audiovisual information data processing apparatus is connected to the Internet.

FIG. 1 is a diagram showing an example of an audiovisual information data processing apparatus in an embodiment of the invention in a state in which the audiovisual information data processing apparatus is connected to the Internet.

The example of the audiovisual information data processing apparatus shown in FIG. 1 includes a data bus line 11 and also includes a network interface 12, a received signal processing section 13, and an audiovisual information data reproducing section 14 connected to this data bus line 11.

The network interface 12 is connected to the Internet 15 forming a data communication network. The network interface 12 transmits audiovisual information data, which is received through the data bus line 11, through the Internet 15. The network interface 12 also receives, for example, audiovisual information data transmitted through the Internet 15 from information supply source such as a server connected to the Internet 15 and transmits the audiovisual information data through the data bus line 11. The audiovisual information data transmitted and received in this way are assumed to be image information data, sound information data, image and sound information data, and the like.

An information signal such as a television broadcast signal or a radio broadcast signal, which is selectively received by an antenna 16 and a tuner 17, is supplied to the received signal processing section 13 as a received signal. Then, the received signal processing section 13 applies various kinds of processing including analog/digital conversion to the received signal from the tuner 17 to form audiovisual information data based on the information signal such as the television broadcast signal or the radio broadcast signal and transmits the audiovisual information data through the data bus line 11.

The audiovisual information data reproducing section 14 reproduces selected audiovisual information data from various information recording media such as a tape-like recording medium, a card-like recording medium, and a disk-like recording medium storing audiovisual information data such as image information data, sound information data, and image and sound information data and transmits the audiovisual information data through the data bus line 11.

An input operation section 18 including data input sections such as a keyboard and a mouse, an information reproducing section 19 that reproduces audiovisual information represented by audiovisual information data from the audiovisual information data, a hard disk drive section (which is a memory section and hereinafter referred to as HDD) 20 incorporating a hard disk serving as an information recording medium forming a large capacity memory section, a central processing unit (CPU) 21 forming an operation control section, a random access memory (RAM) 22 serving as a semiconductor memory, and a read only memory (ROM) 23 serving as a semiconductor memory and storing an operation control program in advance are connected to the data bus line 11. Therefore, data transmission among the network interface 12, the received signal processing section 13, the audiovisual information data reproducing section 14, the input operation section 18, the information reproducing section 19, the HDD 20, the CPU 21, the RAM 22, and the ROM 23 is performed through the data bus line 11.

The information reproducing section 19 includes an image data processing section 24 that is connected to the data bus line 11 and applies processing such as digital/analog conversion to image information data, which is supplied through the data bus line 11, to form an image display signal and an image display section 25 that receives the image display signal from the image data processing section 24 and performs image display based on the image display signal. The information reproducing section 19 further includes a sound data processing section 26 that is connected to the data bus line 11 and applies processing such as digital/analog conversion to sound information data, which is supplied through the data bus line 11, to form a sound reproducing signal and a sound reproducing section 27 that receives the sound reproducing signals from the sound data processing section 26 and performs sound reproduction based on the sound reproducing signals. Therefore, in the information reproducing section 19, image information represented by the image information data supplied through the data bus line 11 is subjected to image display and reproduced by the image display section 25 and sound information represented by the sound information data supplied through the data bus line 11 is reproduced by the sound reproducing section 27.

The CPU 21 performs, for example, control complying with instruction data, which is supplied from the input operation section 18 through the data bus line 11, according to operation of the data input section in the input operation section 18 performed by a user of the example of the audiovisual information data processing apparatus shown in FIG. 1. Then, as a part of the control, the CPU 21 carries out a data storing function for storing audiovisual information data, which is sent from the network interface 12, the received signal processing section 13, or the audiovisual information data reproducing section 14 to the data bus line 11, in the HDD 20 according to instruction data from the input operation section 18, a data managing function for managing audiovisual information data stored in the HDD 20, a data readout function for reading out the audiovisual information data from the HDD 20, and a data information reproducing function that makes arrangements such that audiovisual information represented by audiovisual information data sent from the network interface 12, the received signal processing section 13, or the audiovisual information data reproducing section 14 to the data bus line 11 or audiovisual information data read out from the HDD 20 is reproduced in the information reproducing section 19.

Figure 2:
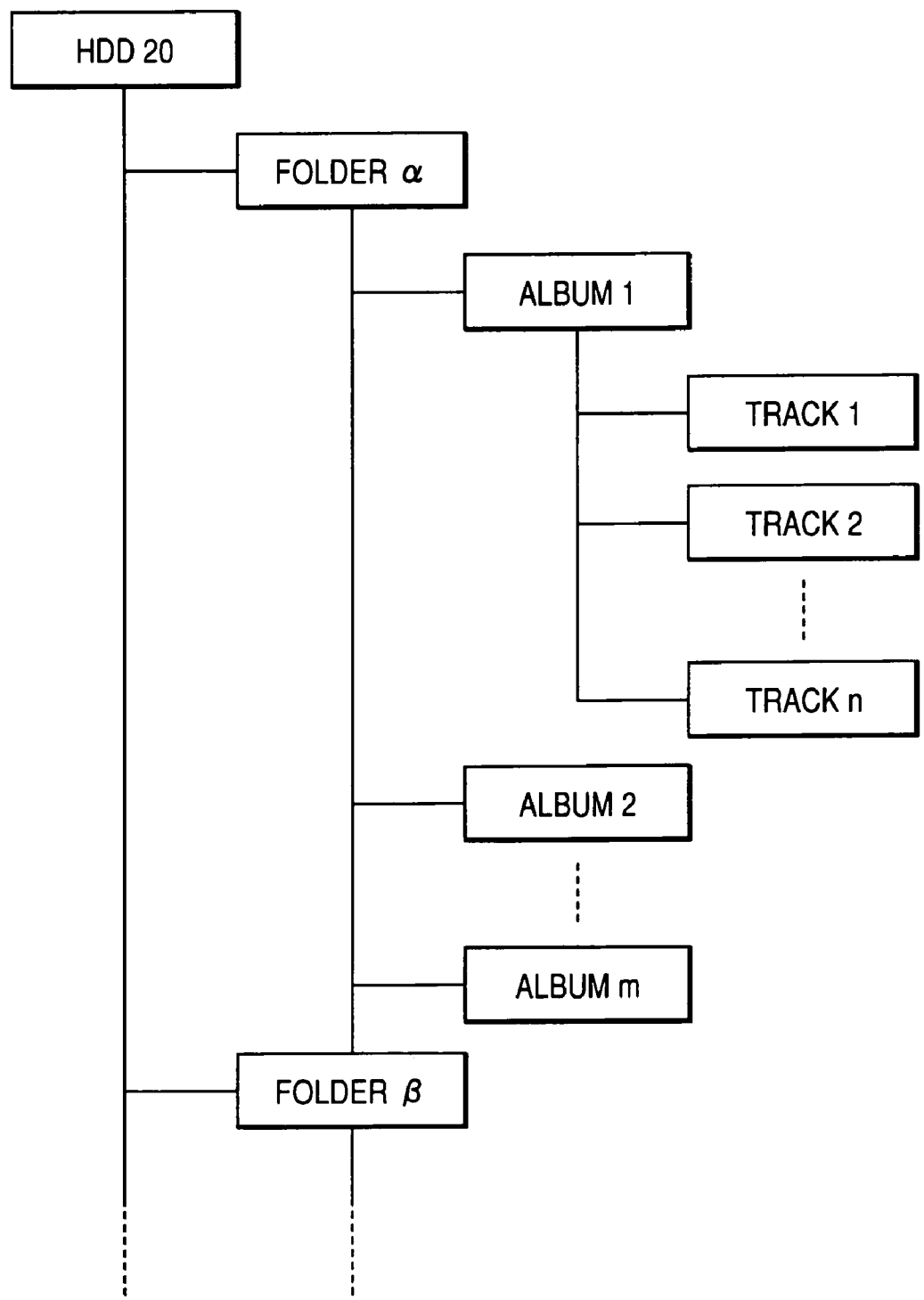
FIG. 2 is a conceptual diagram for explaining an operation of the example of the audiovisual information data processing apparatus shown in FIG. 1.

The audiovisual information data stored in the HDD 20 by the data storing function carried out by the CPU 21 is placed under, for example, a directory shown in FIG. 2, which is formed by the data managing function carried out by the CPU 21. In the directory structure shown in FIG. 2, plural primary folders FOLDER α, FOLDER β, etc. are provided in the HDD 20. Under the primary folder FOLDER α, m (m is a positive integer) secondary folders ALBUM 1, ALBUM 2, . . . , ALBUM m are provided. In addition, other than the primary folder FOLDER α, under respective primary folders such as the primary folder FOLDER β, a required number of secondary folders are also provided. Next, under the secondary folder ALBUM 1, n (n is a positive integer) files TRACK 1, TRACK 2, . . . , TRACK n are provided. Other than the secondary folder ALBUM 1, under respective secondary folders such as the secondary folder ALBUM 2, a required number of files are provided. The respective audiovisual information data stored in the HDD 20 are stored in respective files such as the files TRACK 1, TRACK 2, . . . , TRACK n.

In this way, the audiovisual information data stored in the HDD 20 includes audiovisual information data involving reproduction limitation information representing limitation on reproduction of audiovisual information represented by the audiovisual information data, that is, audiovisual information data with reproduction limitation information. Such reproduction limitation information involved in the audiovisual information data with reproduction limitation information is reproduction period limiting information that limits a reproduction period by setting a reproduction allowing period, number of times of reproduction limiting information that limits the number of times of reproduction by setting the allowed number of times of reproduction, or both the reproduction period limiting information and the number of times of reproduction limiting information. Such reproduction limitation information is included in attribute information incidental to the audiovisual information data with reproduction limitation information. The attribute information includes number of times of reproduction information, latest reproduction date and time information, creation data and time information, and the like in addition to reproduction limitation information.

In a state in which plural audiovisual information data including the audiovisual information data with reproduction limitation information are stored in the HDD 20, when the CPU 21 carries out the data information reproducing function according to instruction data from the input operation section 18, a control operation as described below is performed in the CPU 21.

First, a data forming section 31 incorporated in the CPU 21 forms content list data, which represents lists concerning the audiovisual information data stored in the HDD 20, as image information data based on which image display for the lists is performed by the image data processing section 24 and the image display section 25 included in the information reproducing section 19 to store the content list data in the RAM 22. The content list data is formed, for example, for each of the ALBUMs that are secondary folders in the directory structure formed for the HDD 20. In other words, the respective content list data represent, for example, lists concerning audiovisual information data stored in TRACKs, which are plural files belonging to one secondary folder ALBUM, respectively.

On the other hand, an attribute information detecting section 32 incorporated in the CPU 21 detects the reproduction period limiting information, the number of times of reproduction limiting information, or the reproduction limitation information including both the reproduction period limiting information and the number of times of reproduction limiting information and detects attribute information other than the reproduction limitation information such as the number of times of reproduction limiting information concerning each of the audiovisual information data with reproduction limitation information included in the lists represented by the respective content list data formed by the data forming section 31. Then, a reproduction limited data recognizing section 33 incorporated in the CPU 21 recognizes audiovisual information data, for which a reproduction allowing period for audiovisual information represented by the audiovisual information data has not come or has elapsed or the allowed number of times of reproduction has been reached and it may be impossible to reproduce the audiovisual information, of the audiovisual information data involving reproduction limitation information, which are included in the lists represented by the content list data formed by the data forming section 31, as reproduction limited data with reference to the reproduction period limiting information, the number of times of reproduction limiting information, or the reproduction limitation information including both the reproduction period limiting information and the number of times of reproduction limiting information which are detected by the attribute information detecting section 32.

Subsequently, when image display for the lists represented by the respective content list data formed by the data forming section 31 is performed, an image display control section 34 incorporated in the CPU 21 applies processing for setting a display portion concerning the audiovisual information data with reproduction limitation information, which is recognized as the reproduction limited data by the reproduction limited data recognizing section 33 in the image display for the lists of the content list data, as a portion where specific display allowing a user to easily identify presence of the audiovisual information data is performed to the respective content list data. As a result of the processing applied to the respective content list data formed by the data forming section 31 that is performed by the image display control section 34, in the image display for the lists represented by the respective content list data, a portion, where specific display corresponding to the audiovisual information data with reproduction limitation information recognized as the reproduction limited data by the reproduction limited data recognizing section 33 is performed, is set as, for example, a portion where display is highlighted compared with a display portion around the portion, a portion where display reverse to the display portion around the portion is performed, or a portion where display with a color different from the display portion around the portion is performed.

However, when there is no audiovisual information data with reproduction limitation information that is recognized as reproduction limited data by the reproduction limited data recognizing section 33, the image display control section 34 applies no processing to the respective content list data formed by the data forming section 31.

The respective content list data, which are formed by the data forming section 31, or the respective content list data, which are formed by the data forming section 31 and subjected to the processing by the image display control section 34, are supplied from the CPU 21 to the image data processing section 24 included in the information reproducing section 19 as image information data through the data bus line 11 by the image display control section 34. The image data processing section 24 applies processing such as digital/analog conversion to the respective content list data, forms an image display signal representing the lists concerning the audiovisual information data based on the content list data, and supplies the image display signal to the image display section 25 included in the information reproducing section 19. Consequently, in the image display section 25, for example, image display for a list concerning audiovisual information data belonging to one secondary folder ALBUM is performed. In that case, when the respective content list data, which is formed by the data forming section 31 and subjected to the processing by the image display control section 34, are supplied to the image data processing section 24 as image information data, for example, image display for a list concerning audiovisual information data belonging to one secondary folder ALBUM in the image display section 25 is performed, for example, as shown in FIG. 3, as image display including a portion where specific display corresponding to the audiovisual information data with reproduction limitation information, which is recognized as the reproduction limited data by the reproduction limited data recognizing section 33, is performed.

Figure 3:
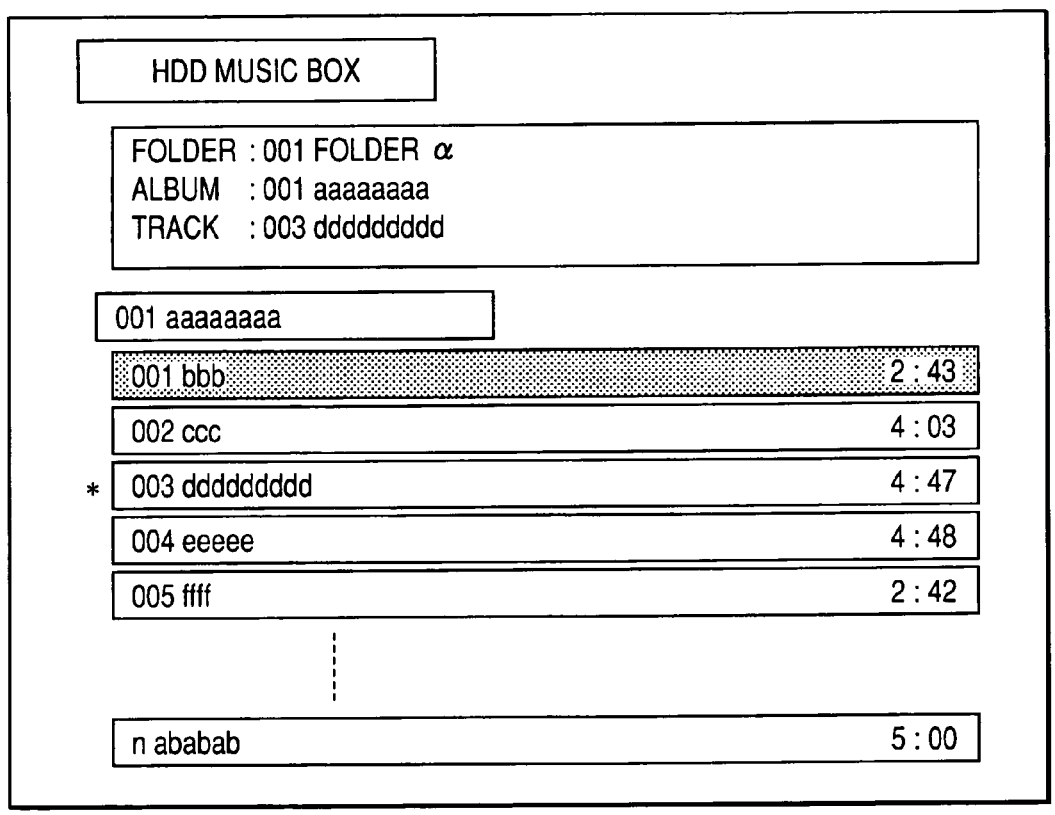
FIG. 3 is a conceptual diagram showing an example of image display that is performed by the example of the audiovisual information data processing apparatus shown in FIG. 1.

An example of image display concerning a list shown in FIG. 3 indicates a list concerning audiovisual information data "001 bbb", "002 ccc", "003 dddddddd", "004 eeeee", "005 fffff", . . . , "n ababab" belonging to a secondary folder ALBUM "001 aaaaaaaa" under a primary folder "001 FOLDER α". In the example of image display concerning a list shown in FIG. 3, the audiovisual information data "001 bbb" is audiovisual information data with reproduction limitation information recognized as reproduction limited data by the reproduction limited data recognizing section 33, that is, audiovisual information data with reproduction limitation information, for which a reproduction allowing period for audiovisual information represented by the audiovisual information data has not come or has elapsed or the allowed number of times of reproduction has been reached and it may be impossible to reproduce the audiovisual information. Therefore, an image display portion corresponding to the audiovisual information data "001 bbb" is set as a portion where specific display is performed, for example, a portion where display with a color different from a display portion around the portion is performed.

In this way, the portion, where specific display is performed, is provided in association with the audiovisual information data with reproduction limitation information, for which a reproduction allowing period for audiovisual information represented by the audiovisual information data has not come or has elapsed or the allowed number of times of reproduction has been reached and it may be impossible to reproduce the audiovisual information, in the image display for the list. Consequently, a user of the apparatus shown in FIG. 1, who looks at the image display for the list, can recognize promptly and easily audiovisual information data with reproduction limitation information, for which a reproduction allowing period for audiovisual information represented by the audiovisual information data has not come or has elapsed or the allowed number of times of reproduction has been reached, of the audiovisual information data with reproduction limitation information stored in the HDD 20. Then, as required, for example, audiovisual information data with reproduction limitation information, for which the reproduction allowing period has elapsed, of audiovisual information data with reproduction limitation information in a state in which limitation represented by the reproduction limitation information functions is deleted from the HDD 20 according to a positive intension of the user.

Then, for example, the user of the apparatus shown in FIG. 1, who looks at the example of image display for the list shown in FIG. 3, selects the audiovisual information data "003 dddddddd" as indicated by asterisk in FIG. 3 in order to reproduce audiovisual information. Then, according to the selection, the CPU 21 sets an operation state in which the audiovisual information data "003 dddddddd" stored in the HDD 20 is read out from the HDD 20 and supplied to the information reproducing section 19 through the data bus line 11 and audiovisual information represented by the audiovisual information data "003 dddddddd" is reproduced by the information reproducing section 19.

Figure 4:
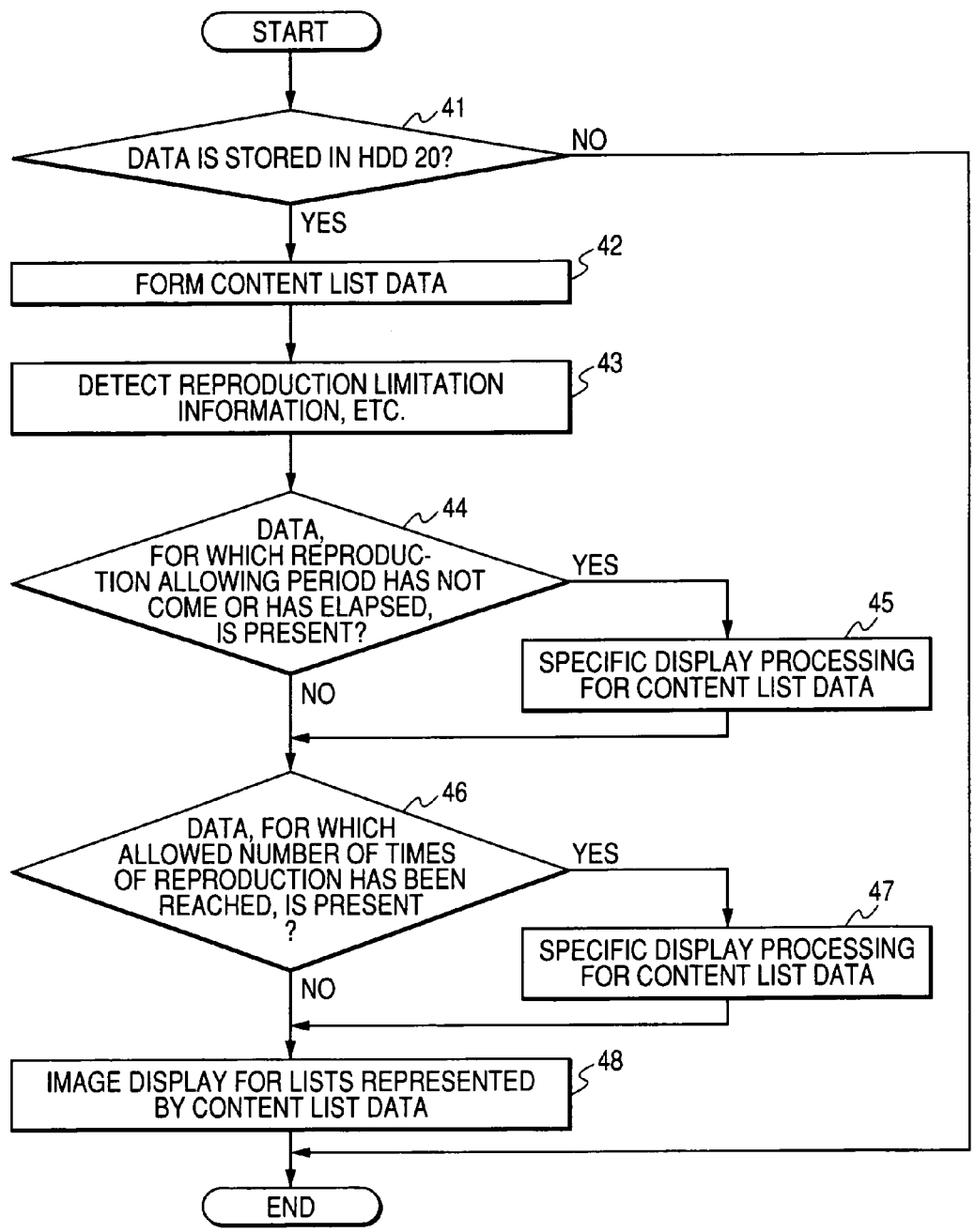
FIG. 4 is a flowchart representing an example of a control program that a CPU in the example of the audiovisual information data processing apparatus shown in FIG. 1 executes in actuating a data forming section, an attribute information detecting section, a reproduction limited data recognizing section, and an image display control section incorporated in the audiovisual information data processing apparatus.

FIG. 4 is a flowchart representing an example of a control program that the CPU 21 executes in actuating the data forming section 31, the attribute information detecting section 32, the reproduction limited data recognizing section 33, and the image display control section 34 incorporated in the CPU 21.

In the control program represented by the flowchart shown in FIG. 4, after the start, in step 41, the CPU 21 judges whether audiovisual information data is stored in the HDD 20. As a result, when audiovisual information data is not stored in the HDD 20, the CPU 21 ends the program. On the other hand, when audiovisual information data is stored in the HDD 20, in step 42, the CPU 21 creates content list data representing lists concerning the audiovisual information data stored in the HDD 20.

Subsequently, in step 43, concerning each of the audiovisual information data with reproduction limitation information included in the lists represented by the content list data formed in step 42, the CPU 21 detects reproduction period limiting information, number of times of reproduction limiting information, or reproduction limitation information including both the reproduction period limiting information and the number of times of reproduction limiting information and detects attribute information other than the reproduction limitation information such as the number of times of reproduction information. Next, in step 44, the CPU 21 judges whether audiovisual information data with reproduction limitation information, for which a reproduction allowing period for audiovisual information has not come or has elapsed, is present in the audiovisual information data with reproduction limitation information, which are included in the lists represented by the respective content list data formed in step 42, with reference to the reproduction limitation information detected in step 43.

As a result, when audiovisual information data with reproduction limitation information, for which a reproduction allowing period for audiovisual information has not come or has elapsed, is present, the CPU recognizes the audiovisual information data with reproduction limitation information as reproduction limited data and proceeds to step 45. In step 45, the CPU 21 applies specific display processing for, when image display for the lists represented by the respective content list data formed in step 42 is performed, setting a display portion for the audiovisual information data with reproduction limitation information, which is recognized as reproduction limited data in step 44, in the image display for the lists as a portion where specific display for allowing a user to easily recognize presence of the audiovisual information data to the respective content list data and proceeds to step 46.

On the other hand, as a result of the judgment in step 44, when no audiovisual information data with reproduction limitation information, for which the reproduction allowing period for the audiovisual information has not come or has elapsed, is present, the CPU 21 proceeds to step 46 directly. In step 46, the CPU 21 judges whether audiovisual information data with reproduction limitation information, for which the allowed number of times of reproduction for the audiovisual information has been reached, is present in the audiovisual information data with reproduction limitation information included in the lists represented by the content list data formed in step 42 with reference to the reproduction limitation information and the number of times of reproduction limiting information detected in step 43.

As a result, when audiovisual information data with reproduction limitation information, for which the allowed number of times of reproduction for the audiovisual information has been reached, is present, the CPU 21 recognizes that the audiovisual information data with reproduction limitation information as reproduction limited data and proceeds to step 47. In step 47, the CPU 21 applies specific display processing for, when image display for the lists represented by the respective content list data formed in step 42 is performed, setting a display portion for the audiovisual information data with reproduction limitation information, which is recognized as reproduction limited data in step 46, in the image display for the lists as a portion where specific display for allowing a user to easily recognize presence of the audiovisual information data to the respective content list data and proceeds to step 48.

As a result of the judgment in step 46, when no audiovisual information data with reproduction limitation information, for which the allowed number of times of reproduction for the audiovisual information has been reached, is present, the CPU 21 proceeds to step 48 directly. In step 48, the CPU 21 supplies the respective content list data formed in step 42, the respective content list data that is formed in step 42 and, then, subjected to the specific display processing in step 45, the respective content list data that is formed in step 42 and, then, subjected to the specific display processing in step 47, or the respective content list data that is formed in step 42 and, then, subjected to the specific display processing in both steps 45 and 47 as image information data to the image data processing section 24 included in the information reproducing section 19 through the data bus line 11 such that, for example, image display for a list concerning audiovisual information data belonging to one secondary folder ALBUM is performed in the image display section 25. Thereafter, the CPU 21 ends the program.

As described above, according to the audiovisual information data processing apparatus in the embodiment of the invention, when the lists concerning the audiovisual information data stored in the memory section are subjected to image display by the image display section, the audiovisual information data, for which a reproduction allowing period for audiovisual information represented by the audiovisual information data has not come or has elapsed or the allowed number of times of reproduction has been reached, of the audiovisual information data involving reproduction limitation information included in the lists is displayed as reproduction limited data in the portion, where specific display is performed, set as, for example, a portion where display is highlighted compared with a display portion around the portion, a portion where display reverse to the display portion around the portion is performed, or a portion where display with a color different from the display portion around the portion is performed. Accordingly, a user of the apparatus can immediately learn the audiovisual information data involving reproduction limitation information, for which a reproduction allowing period for audiovisual information represented by the audiovisual information data has not come or has elapsed or the allowed number of times of reproduction has been reached, in the lists subjected to image display.

Therefore, the user of the apparatus can recognize promptly and easily that the audiovisual information data with reproduction limitation information, which is stored in the memory section in the information reproduction system, come into a state in which limitation represented by the reproduction limitation information functions. Thereafter, for example, among the audiovisual information data with reproduction limitation information that come into a state in which limitation represented by the reproduction limitation information functions, for example, audiovisual information data, for which the reproduction allowing period has elapsed or the allowed number of reproduction has been reached, is deleted from the memory section according to a positive intension of the user of the apparatus.

In the audiovisual information data processing apparatus the embodiment of the invention, a user of the apparatus can immediately learn audiovisual information data involving reproduction limitation information, for which a reproduction allowing period for audiovisual information represented by the audiovisual information data has not come or has elapsed or the allowed number of times of reproduction has been reached, in lists concerning audiovisual information data subjected to image display and stored in a memory section. Therefore, the user of the apparatus can recognize promptly and easily that the audiovisual information data with reproduction limitation information, which is stored in the memory section, come into a state in which limitation represented by the reproduction limitation information functions. Thus, it is possible to use the audiovisual information data processing apparatus widely as an audiovisual information data processing apparatus that can treat audiovisual information data such as image information data and sound information data efficiently.

It should be understood by those skilled in the art that various modifications, combinations, sub-combinations, and alterations may occur depending on design requirements and other factors insofar as they are within the scope of the appended claims or the equivalents thereof.

What is claimed is:

1. An audiovisual information data processing apparatus comprising:
   a memory section that stores a plurality of pieces of audiovisual information data and reproduction limitation information that represents reproduction limitation of the audiovisual information data; and
   a controller that (i) detects the reproduction limitation information for each piece of the audiovisual information data, (ii) recognizes whether or not each piece of the audiovisual information data is allowed to reproduce in accordance with the detected reproduction limitation information, and (iii) controls an image display section to display a content list of the audiovisual information data stored in the memory section,
   wherein the content list includes a plurality of areas relative to the audiovisual information data, each area includes a title of the audiovisual information data, and
   wherein, in the content list, an area relative to the audiovisual information data which is not allowed to reproduce is displayed different from an area relative to the audiovisual information data which is allowed to reproduce.

2. The audiovisual information data processing apparatus according to claim 1, wherein said audiovisual information data is either one of image information data, sound information data or image and sound information data.

3. The audiovisual information data processing apparatus according to claim 1, wherein, in the content list, the area relative to the audiovisual information data which is not allowed to reproduce is differentially highlighted compared with the area relative to the audiovisual information data which is allowed to reproduce.

4. The audiovisual information data processing apparatus according to claim 1, wherein, in the content list, the area relative to the audiovisual information data which is not allowed to reproduce is reversed compared with the area relative to the audiovisual information data which is allowed to reproduce.

5. The audiovisual information data processing apparatus according to claim 1, wherein, in the content list, the area relative to the audiovisual information data which is not allowed to reproduce is differentially colored compared with the area relative to the audiovisual information data which is allowed to reproduce.

6. An audiovisual information data processing apparatus comprising:
   memory means for storing a plurality of pieces of audiovisual information data and reproduction limitation information that represents reproduction limitation of the audiovisual information data; and
   controller means for detecting the reproduction limitation information for each piece of the audiovisual information data, recognizing whether or not each piece of the audiovisual information data is allowed to reproduce in accordance with the detected reproduction limitation information, and controlling an image display section to display a content list of the audiovisual information data stored in the memory section,
   wherein the content list includes a plurality of areas relative to the audiovisual information data, each area includes a title of the audiovisual information data, and
   wherein, in the content list, an area relative to the audiovisual information data which is not allowed to reproduce is displayed different from an area relative to the audiovisual information data which is allowed to reproduce.

7. The audiovisual information data processing apparatus according to claim 6, wherein said audiovisual information data is either one of image information data, sound information data or image and sound information data.

8. The audiovisual information data processing apparatus according to claim 6, wherein, in the content list, the area relative to the audiovisual information data which is not allowed to reproduce is differentially highlighted compared with the area relative to the audiovisual information data which is allowed to reproduce.

9. The audiovisual information data processing apparatus according to claim 6, wherein, in the content list, the area relative to the audiovisual information data which is not allowed to reproduce is reversed compared with the area relative to the audiovisual information data which is allowed to reproduce.

10. The audiovisual information data processing apparatus according to claim 6, wherein, in the content list, the area relative to the audiovisual information data which is not allowed to reproduce is differentially colored compared with the area relative to the audiovisual information data which is allowed to reproduce.

* * * * *